United States Patent
Raison et al.

(10) Patent No.: US 8,955,796 B2
(45) Date of Patent: Feb. 17, 2015

(54) AFT AERODYNAMIC FAIRING WITH IMPROVED THERMAL RESISTANCE FOR A PYLON FOR ATTACHING AN AIRCRAFT PROPELLING ASSEMBLY

(71) Applicant: Airbus Operations (SAS), Toulouse (FR)

(72) Inventors: Fabien Raison, Plaisance du Touch (FR); Stephane Romani, Toulouse (FR); Laurent Bell, Gagnac sur Garonne (FR)

(73) Assignee: Airbus Operations (SAS), Toulouse (FR)

( * ) Notice: Subject to any disclaimer, the term of this patent is extended or adjusted under 35 U.S.C. 154(b) by 348 days.

(21) Appl. No.: 13/845,660

(22) Filed: Mar. 18, 2013

(65) Prior Publication Data
US 2013/0320135 A1    Dec. 5, 2013

(30) Foreign Application Priority Data
Mar. 27, 2012   (FR) ...................................... 12 52745

(51) Int. Cl.
| B64D 27/00 | (2006.01) |
| B64D 29/06 | (2006.01) |
| B64D 29/02 | (2006.01) |
| B64D 33/04 | (2006.01) |

(52) U.S. Cl.
CPC ................ B64D 29/06 (2013.01); B64D 29/02 (2013.01); B64D 33/04 (2013.01)
USPC .............................. 244/54; 244/53 R; 60/796

(58) Field of Classification Search
USPC ................................................ 244/54, 53 R
See application file for complete search history.

(56) References Cited

U.S. PATENT DOCUMENTS

| 4,238,092 | A | * | 12/1980 | Brennan ........................... 244/54 |
| 4,712,750 | A | * | 12/1987 | Ridgwell ................... 244/117 A |
| 4,802,823 | A | * | 2/1989 | Decko et al. ................. 416/97 A |
| 6,340,135 | B1 | * | 1/2002 | Barton ......................... 244/53 B |
| 7,352,744 | B2 | * | 4/2008 | Saint Etienne et al. ........ 370/389 |
| 7,445,179 | B2 | * | 11/2008 | Diochon et al. ................. 244/54 |
| 7,677,044 | B2 | * | 3/2010 | Barbeln et al. .................. 60/752 |
| 7,797,947 | B2 | * | 9/2010 | Lafont et al. .................... 60/796 |

(Continued)

FOREIGN PATENT DOCUMENTS

| EP | 0867366 | 9/1998 |
| EP | 2190739 | 6/2010 |

(Continued)

OTHER PUBLICATIONS

French Search Report, Jan. 8, 2013.

*Primary Examiner* — Christopher P Ellis
*Assistant Examiner* — Medhat Badawi
(74) *Attorney, Agent, or Firm* — Greer, Burns & Crain Ltd.

(57) ABSTRACT

An aft aerodynamic fairing for a pylon for attaching an aircraft propelling assembly, including a caisson structure, a heat-shield floor, as well as a support structure for this floor comprising linking parts arranged to link two side edges of this floor to the caisson structure. The linking parts of each side edge of the floor are configured so as to allow travelling motion of the side edge relative to the caisson structure in a corresponding direction included in a plane orthogonal to a longitudinal direction of the fairing. The linking parts form a sliding link between the floor and the caisson structure, reducing the stresses induced by the deformations of these elements in use.

9 Claims, 3 Drawing Sheets

(56) References Cited

U.S. PATENT DOCUMENTS

| | | | |
|---|---|---|---|
| 7,971,826 B2* | 7/2011 | Journade et al. | 244/54 |
| 7,988,092 B2* | 8/2011 | Bonnaud et al. | 244/121 |
| 8,061,649 B2* | 11/2011 | Journade et al. | 244/54 |
| 8,118,252 B2* | 2/2012 | Dumont et al. | 244/54 |
| 8,336,812 B2* | 12/2012 | Beaufort et al. | 244/54 |
| 8,474,750 B2* | 7/2013 | Marche et al. | 244/54 |
| 8,517,305 B2* | 8/2013 | Marche et al. | 244/54 |
| 8,579,231 B2* | 11/2013 | Machado et al. | 244/54 |
| 8,607,453 B2* | 12/2013 | Machado et al. | 29/889.2 |
| 8,662,440 B2* | 3/2014 | Journade et al. | 244/54 |
| 8,800,917 B2* | 8/2014 | Machado et al. | 244/54 |
| 2003/0201366 A1* | 10/2003 | Connelly et al. | 244/121 |
| 2007/0102494 A1* | 5/2007 | Connelly et al. | 228/157 |
| 2008/0067292 A1* | 3/2008 | Bonnaud et al. | 244/199.1 |
| 2008/0169378 A1* | 7/2008 | Beaufort et al. | 244/54 |
| 2008/0217467 A1* | 9/2008 | Lafont | 244/54 |
| 2008/0224018 A1* | 9/2008 | Lafont et al. | 248/554 |
| 2008/0245926 A1* | 10/2008 | Journade et al. | 244/54 |
| 2008/0251633 A1* | 10/2008 | Journade et al. | 244/54 |
| 2009/0095443 A1* | 4/2009 | Connelly | 165/51 |
| 2009/0200418 A1* | 8/2009 | Beaufort | 244/54 |
| 2010/0051743 A1* | 3/2010 | Dumont et al. | 244/54 |
| 2010/0284313 A1* | 11/2010 | Monnier | 370/294 |
| 2011/0011972 A1* | 1/2011 | Vache | 244/54 |
| 2011/0036942 A1* | 2/2011 | Marche et al. | 244/54 |
| 2011/0155847 A1* | 6/2011 | Journade et al. | 244/54 |
| 2011/0290935 A1* | 12/2011 | Machado et al. | 244/54 |
| 2011/0290936 A1* | 12/2011 | Machado et al. | 244/54 |
| 2012/0047910 A1* | 3/2012 | Sutcu et al. | 60/796 |
| 2012/0080554 A1* | 4/2012 | Lafont et al. | 244/54 |
| 2013/0032662 A1* | 2/2013 | Dumont et al. | 244/54 |
| 2013/0105622 A1* | 5/2013 | Journade | 244/54 |
| 2013/0174572 A1* | 7/2013 | Raison et al. | 60/782 |
| 2013/0221157 A1* | 8/2013 | Machado et al. | 244/130 |
| 2013/0320135 A1* | 12/2013 | Raison et al. | 244/54 |

FOREIGN PATENT DOCUMENTS

| | | |
|---|---|---|
| FR | 2913665 | 9/2008 |
| WO | 2009037267 | 3/2009 |

* cited by examiner

AFT AERODYNAMIC FAIRING WITH IMPROVED THERMAL RESISTANCE FOR A PYLON FOR ATTACHING AN AIRCRAFT PROPELLING ASSEMBLY

CROSS-REFERENCES TO RELATED APPLICATIONS

This application claims the benefit of the French patent application No. 12 52745 filed on Mar. 27, 2012, the entire disclosures of which are incorporated herein by way of reference.

BACKGROUND OF THE INVENTION

The present invention relates to the field of pylons for attaching aircraft engines and more precisely relates to the improvement in the thermal resistance of an aft aerodynamic fairing of such an attaching pylon.

This kind of attaching pylon, also called engine mounting structure (EMS) enables an engine to be suspended below the aircraft aerofoil, this engine to be mounted above the same aerofoil, or even this engine to be assembled at the rear part of the aircraft fuselage.

The invention can be used on any kind of aircraft equipped with turbojet engines or turbo-propellers, or even any other kind of turbine engine.

An attaching pylon is generally provided to be the linking interface between a turbine engine and an aircraft aerofoil. It allows to transmit to the structure of the aircraft strains generated by the associated engine thereof, and also allows conveyance of fuel, electrical, hydraulic and air systems between the engine and the aircraft.

In order to ensure the transmission of strains, the attaching pylon includes a rigid structure also called primary structure, usually of the "caisson" type, that is formed by assembling upper and lower spares and side panels connected to each other through transverse stiffening ribs.

Furthermore, the device is provided with attaching means interposed between the engine and the rigid structure, these means usually including two fasteners, commonly called engine fasteners, as well as a device for recovering thrust strains generated by the engine.

Analogously, the attaching pylon generally includes another series of fasteners making up a mounting system interposed between the rigid structure and the aircraft aerofoil, this system usually consisting of two or three fasteners.

Besides, such a pylon is provided with a plurality of secondary structures ensuring segregation and maintenance of systems while supporting aerodynamic fairing elements, the latter generally taking the form of assemblies of panels mounted onto these structures. In a manner known to those skilled in the art, the secondary structures are different from the rigid structure in that they are not intended to ensure transfer of strains from the engine to the aircraft aerofoil.

Among the secondary structures, there is the aft aerodynamic fairing, also called "Aft Pylon Fairing" ("APF"), which ensures a plurality of functions among which it is to be noted the formation of a heat or fireproof barrier, and the formation of an aerodynamic continuity between the engine outlet and the attaching pylon. This fairing assumes a lower position when the engine is intended to be placed under the wing, and assumes an upper position when the engine is intended to be placed above the wing. An exemplary fairing known in the art is disclosed in document EP 2 190 739, the contents of which are incorporated herein by reference.

This aft aerodynamic fairing generally takes the form of a caisson structure comprising two side panels assembled together by inner transverse stiffening ribs spaced from each other in a longitudinal direction of the fairing, as well as a heat-shield floor which is generally fastened to the caisson structure by splicing. It is set out that the caisson structure is usually not closed opposite to the heat-shield floor, that is at the upper part when the engine is intended to be suspended below the aircraft aerofoil, since it is at this place that this structure comes to be connected onto the other pylon structures, in particular on the so-called rear secondary structure (RSS). Nevertheless, a spar for closing the caisson structure can however be provided opposite the heat-shield floor.

The side panels of the aft aerodynamic structure and the aft aerodynamic fairing, which are lying in the continuity of each other, are provided such that a cold air flow, such as the secondary flow of the engine when the same is a turbofan engine, externally conforms to the shape thereof because of the implantation of these side panels in the secondary flow annular channel of the engine and/or at the outlet of this channel.

The heat-shield floor in turn has an outer face provided such that a hot flow of engine combustion gases, also called exhaust gases, that can reach temperatures in the order of 540° C., conforms to the shape thereof these temperatures tending to increase with recent trends in developing techniques implemented in turbojet engines. Temperatures reaching about 750° C. are indeed contemplated in some aircraft turbine engines under development.

This increase in combustion gas temperature raises numerous problems in particular with respect to heat resistance of materials forming the heat-shield floor and differential heat expansion of these materials with respect to materials making up the fairing caisson structure.

The increase in the differential heat expansion of these materials leads in particular to an increase in mechanical stresses undergone by the devices for splicing this floor to the abovementioned caisson structure.

SUMMARY OF THE INVENTION

By the method object of the present invention, the acceptance of an aircraft movable control surface is made by controlling its inertial properties (static momentum, frictional momentum and momentum of inertia), such that these inertial properties remain within a certain range. Besides, the method of the invention does not require the removal of the movable control surface from the aircraft.

One object of the invention is in particular to provide a simple, economical and efficient solution to these problems, allowing to avoid at least partly the abovementioned drawbacks.

To this end, the invention provides an aft aerodynamic fairing for a pylon for attaching an aircraft propelling assembly, including a caisson structure, a heat-shield floor provided with an external surface such that a combustion gas flow from a turbine engine of said propelling assembly conforms to the shape thereof, as well as means for supporting this floor comprising linking means for linking two side edges of this floor to the caisson structure.

According to the invention, said linking means are configured so as to allow travelling motion of each side edge of the floor relative to the caisson structure in a corresponding direction included in a plane orthogonal to a longitudinal direction of the fairing.

By "longitudinal direction of the fairing", it is to be understood a direction generally parallel to the direction of advance of an aircraft equipped with said propelling assembly, and thus also to a longitudinal axis of this propelling assembly.

The plane orthogonal to this longitudinal direction can thus be considered as a transverse plane of the fairing.

The abovementioned caisson structure typically includes internal stiffening elements as well as two side panels connected to these internal elements, in a well-known manner.

The linking means for linking each side edge of the floor to the caisson structure of the fairing make up a sliding link in the abovementioned direction which, for that reason, is called main sliding direction in the following.

This kind of link enables the stresses of materials forming the heat-shield floor induced by differential heat expansion, in this main sliding direction, with respect to the materials making up the caisson structure of the fairing to be dramatically reduced. Indeed, floor deformations relative to the caisson structure, in particular due to differential expansions, can lead to free travelling motion of the floor edges relative to the caisson structure in the main sliding direction, instead of leading to strains applied to nut or rivet type splicing securing means used in prior art.

It is worth noting that the abovementioned internal stiffening elements take for example the form of transverse ribs, in a known manner per se.

Said linking means are preferably configured so as to further allow travelling motion of each of said side edges of the floor relative to the caisson structure in a longitudinal direction of the floor.

The linking means of each side edge of the floor thus also make up a sliding link in the longitudinal direction of the floor which, for that reason is called secondary sliding direction in the following.

This characteristic enables stresses induced by the differential heat expansion, in this secondary sliding direction, of the materials forming the floor with respect to the materials making up the caisson structure, to be reduced.

In a preferred embodiment of the invention, said linking means of each side edge of the floor comprise a corresponding side groove integral with a first element among the caisson structure and the floor and extending from the front to the rear along this first element by being opened in said corresponding main sliding direction, as well as a corresponding side tab integral with the second element among the caisson structure and the floor, said side tab extending from the front to the rear along this second element and being engaged in the abovementioned groove so as to provide for support of said floor.

It is worth noting that each abovementioned side groove is preferably continuous along said first element, but can alternatively be formed by several separated portions extending each other.

Each abovementioned side tab preferably has a transverse cross-section being conjugated to the transverse cross-section of the corresponding side groove, such that mounting of the tab into the groove is substantially adjusted in a transverse direction perpendicular to the main sliding direction. By transverse direction, it should of course be understood a direction included in a transverse plane, that is a plane orthogonal to the longitudinal direction of the fairing.

In the preferred embodiment of the invention, the transverse extent of said floor, as well as the gap between respective bottoms of two side grooves belonging to the linking means of said edges of the floor respectively, are reduced from the front to the rear of the fairing.

The heat-shield floor has also a tapered shape that can be similar to the entire fairing profile, which is preferably tapered for aerodynamism reasons, in a known manner per se.

In the preferred embodiment of the invention, each side groove is formed in the edge of a rim formed at one end of a corresponding side panel belonging to said caisson structure, whereas the corresponding side tab projectingly extends from an edge of said floor.

Each side groove is thus integral with the corresponding side panel, in which case the abovementioned first element consists of the caisson structure of the floor, whereas each tab is integral with the floor, which thus consists of the abovementioned second element.

Advantageously, each side tab of said linking means includes at least one port through which a corresponding retainer element integral with said first element among the caisson structure and the floor loosely passes, so as to allow said travelling motion of the corresponding side edge of the floor relative to the caisson structure along the abovementioned main sliding direction.

The invention also relates to an attaching pylon for an aircraft propelling assembly, comprising an aft aerodynamic fairing of the type described above.

The invention also relates to a propelling assembly for an aircraft, comprising a turbine engine as well as an attaching pylon of the type described above for attaching this turbine engine to the aerofoil or fuselage of an aircraft.

The invention further relates to an aircraft comprising a propelling assembly of the type described above.

Finally, the invention relates to a method for assembling an aft aerodynamic fairing of the type described above, comprising the steps of:

positioning said heat-shield floor in front of said caisson structure of the fairing by bringing each side tab of said linking means facing said corresponding side groove;

moving the floor in travelling motion to the front relative to said caisson structure, by engaging and then sliding each side tab in said corresponding side groove, until the floor reaches a nominal position.

Besides the advantages described above in connection with the fairing, this method has the advantage to be particularly simple to be implemented.

This method preferably includes a subsequent step of activating means for longitudinally retaining the floor in its nominal position.

Alternatively or additionally, this method can include a subsequent step of, for each side tab of the linking means, loosely engaging at least one retainer element integral with said second element among the caisson structure and the floor in a through port provided in said side tab, with clearance along a plane comprising said corresponding main sliding direction and said longitudinal direction of the floor.

BRIEF DESCRIPTION OF THE DRAWINGS

The invention will be better understood, and further details, advantages and characteristics of the same will appear upon reading the following description given by way of non-limiting example and in reference to the appended drawings wherein.

In all of these figures, identical references can designate identical or analogous elements.

DETAILED DESCRIPTION OF THE PREFERRED EMBODIMENTS

Figure 1:
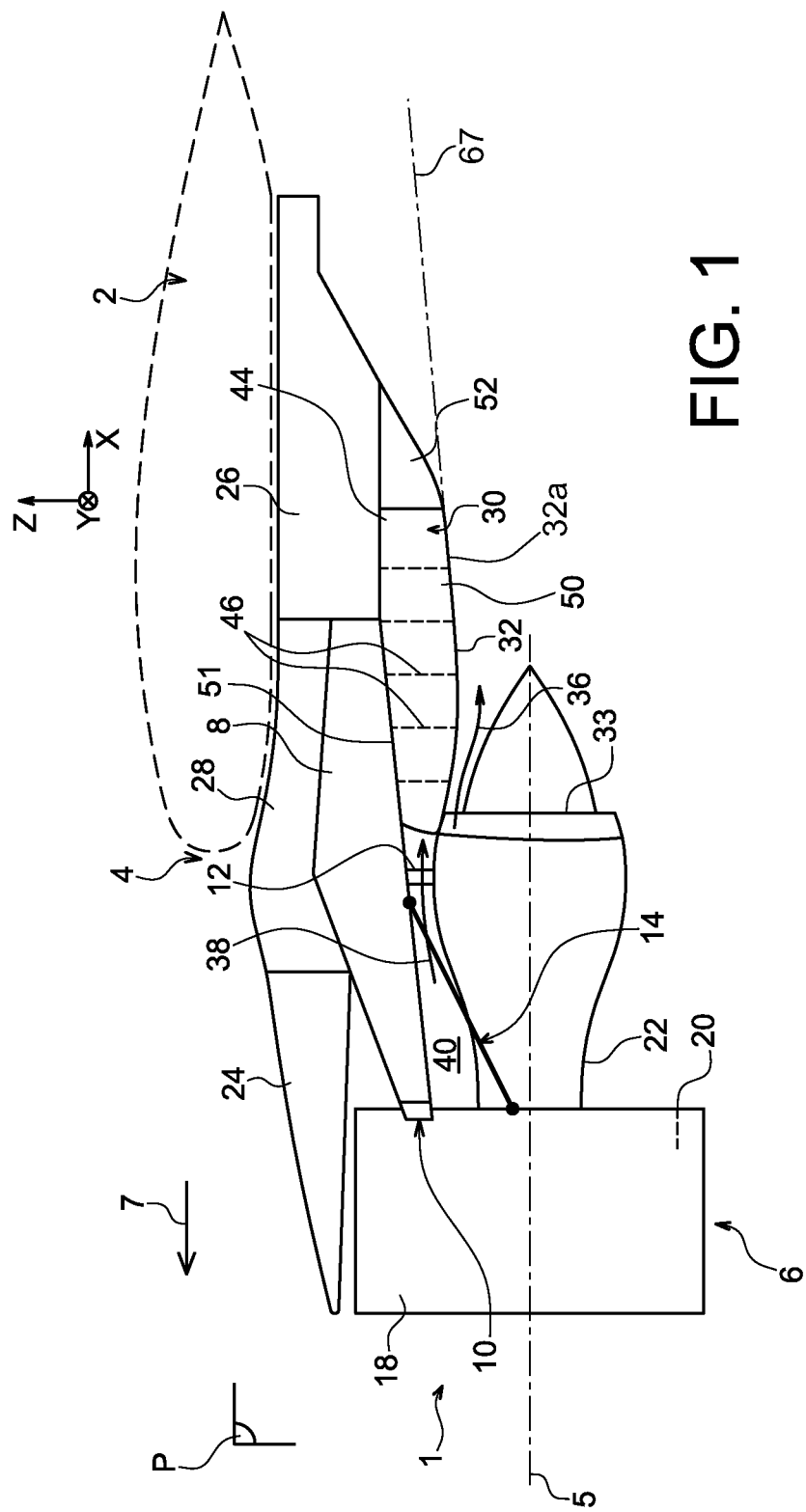
FIGS. 1 and 2 are side schematic partial views of a propelling assembly for an aircraft according to a first preferred embodiment of the present invention.

FIG. 1 illustrates a propelling assembly 1 for an aircraft according to a first preferred embodiment of the present invention, intended to be fastened under an aircraft wing 2, this propelling assembly 1 including an attaching pylon 4, as well as a turbofan engine 6 attached under this attaching pylon 4.

As a whole, the attaching pylon 4 includes a rigid structure 8, also called primary structure, carrying elements for attaching the engine 6, these attaching elements having a plurality of engine fasteners 10, 12, as well as a device 14 for recovering thrust strains generated by the turbojet engine 6.

The attaching pylon 4 includes another series of fasteners (not shown) assembled onto the rigid structure 8 and enabling this propelling assembly 1 to be suspended under the wing 2 of the aircraft.

Furthermore, the propelling assembly 1 is intended to be surrounded by a nacelle (not visible in FIG. 1).

In the entire description that follows, by convention, X designates the longitudinal direction of the attaching pylon 4 which can also be considered as the longitudinal direction of the turbojet engine 6 and that of the lower aft aerodynamic fairing which will be introduced hereinafter, this direction X being parallel to a longitudinal axis 5 of this turbojet engine 6. On the other hand, Y designates the direction transversely directed with respect to the attaching pylon 4 and that can also be considered as the transverse direction of the turbojet engine 6 and that of the lower aft aerodynamic fairing, and Z the vertical or height direction, all three directions X, Y and Z being orthogonal between each other.

On the other hand, the terms "front" and "rear" are to be considered with respect to a direction of advance of the aircraft of the turbojet engine 6 in use, this direction being schematically represented by the arrow 7.

In FIG. 1, there can thus be seen both engine fasteners 10, 12, the device for recovering thrust strains 14, the rigid structure 8 of the attaching pylon 4, as well as a plurality of secondary structures assembled onto the rigid structure 8. These secondary structures ensuring segregation and maintenance of the systems while supporting aerodynamic fairing elements will be described hereinafter.

It is indicated that the turbojet engine 6 is provided in the front with a fan casing 18 having a great dimension bounding a fan annular channel 20, and includes at the rear a center casing 22 having a small dimension, enclosing the core of this turbojet engine. The casings 18 and 22 are of course integral with each other.

The rigid structure 8 of the attaching pylon 4 takes the form of a caisson extending from the front to the rear, substantially in the longitudinal direction X, provided with transverse ribs (not shown) each taking the form of a rectangle oriented in a plane XZ.

The attaching elements first include a front engine fastener 10 interposed between a front end of the rigid structure 8 also called pyramid, and an upper part of the fan casing 18.

Furthermore, a rear engine fastener 12 is interposed between the rigid structure 8 and the center casing 22.

Still in reference to FIG. 1, there are among the secondary structures of the pylon 4 a fore aerodynamic structure 24, an aft aerodynamic structure 26, a fairing 28 for connecting these fore and aft aerodynamic structures, and a lower aft aerodynamic fairing 30.

The fore aerodynamic structure 24 is placed in the lower front extension of the aerofoil 2 and above the primary structure 8. It is fixedly mounted on the rigid structure 8, and has an aerodynamic profile function between an upper part of fan covers hinged to this fore aerodynamic structure 24, and the leading edge of the aerofoil. This fore aerodynamic structure 24 has not only an aerodynamic fairing function, but it also allows the placement, segregation and conveyance of different systems (air, electrical, hydraulic and fuel). Furthermore, the front part of this fore structure 24 being not in contact with the rigid structure 8, a heat exchanger is usually interposed in the space defined between both elements.

Directly in the rear extension of this fore structure 24, still under the aerofoil and mounted above the rigid structure 8 is the connecting fairing 28, also called "karman".

Then, still to the rear, the connecting fairing 28 is extended to the aft aerodynamic structure 26, called Rear Secondary Structure (RSS), which contains part of the pylon equipment. This aft structure 26 is preferably located wholly to the rear with respect to the rigid structure 8, and is thus attached under the aircraft aerofoil.

Finally, under the rigid structure 8 and the aft aerodynamic structure 26, is the lower aft aerodynamic fairing 30, also called "shield" or "Aft Pylon Fairing". Its essential functions are the formation of a heat barrier also called fireproof barrier used for protecting the pylon and aerofoil from heat discharged by the primary flow, and the formation of an aerodynamic continuity between the outlet of the engine and the attaching pylon.

In a known manner to those skilled in the art, the above-mentioned lower aft aerodynamic fairing 30 includes a heat-shield floor 32 provided with an external surface 32a such that a primary flow of the engine it partially radially outwardly bounds with respect to the axis 5 of the turbojet engine conforms to the shape thereof. This primary flow, schematically represented by the arrow 36, is formed by hot combustion gases exhausted from a nozzle 33 of the engine.

It is worth noting that in the example described herein wherein the turbojet engine 6 is intended to be suspended under the aircraft aerofoil, the heat-shield floor 32 makes up a lower portion of the fairing 30, whereas a closing spar 51, opposite to the floor 32, makes up an upper portion of this fairing 30 (FIG. 1). Naturally, the situation of both elements 32, 51 would be reversed in the alternative case where the turbojet engine would be intended to be implanted above the aerofoil. Besides, it is noted that in this alternative case within the scope of the present invention, the fairing 30 would become an upper aft aerodynamic fairing. On the other hand, the upper part of the caisson could alternatively be free of closing spar, and only sealed by the elements 8, 26 directly adjacent in the direction Z.

Still in a known manner, the lower aft aerodynamic fairing 30 is mounted to the aft aerodynamic structure 26 and the rigid structure 8 (FIG. 1).

This aft aerodynamic fairing 30 has as a whole a plane of symmetry P corresponding to a plane XZ, this plane P also making up a vertical plane of symmetry for the entire attaching pylon 4, and for the engine 6.

Besides, the fairing 30 also includes two side panels 44 which in turn provided such that a secondary flow of the engine schematically represented by the arrow 38 externally conforms to the shape thereof, due to their implantation in the annular channel 40 of the secondary flow of the engine (FIG. 1) and/or the outlet thereof.

Both side panels 44 of the fairing 30 are approximately directly in a plane XZ and provided on either side of the plane of symmetry P. They are assembled together by transverse inner stiffening ribs 46 spaced from each other in the direction X, each of these ribs 46 being directed in a plane YZ and taking for example the form of a rectangle or square.

The assembly formed by the transverse ribs 46 and side panels 44 of the fairing 30 makes up a caisson structure, in the terminology of the present invention.

The side panels 44 are fixedly and directly mounted on side portions of each of the inner ribs 46, using conventional means known to those skilled in the art.

Still in reference to FIG. 1, there can be seen that the fairing 30 is comprised of two distinct portions but integral with each other, namely a front portion 50 making most of the fairing, for example 60 to 85% thereof in terms of length in the direction X, and a narrower rear portion 52 wholly taking the form of a pyramid or of a point the base of which is rigidly connected to the front portion 50, and the apex of which makes up a rear end of the fairing 30.

In the preferred embodiment which is illustrated in the figures, the front portion 50 has a transverse extent tapering from the front to the rear of the fairing 30.

The side panels 44 and the closing spar 51 each preferably extend as a single piece from one end of the fairing 30 to the other, that is both along the front portion 50, and along the rear portion 52. On the other hand, the heat-shield floor 32 in turn preferably extends as a single piece only on the front portion 50, and not on the rear portion 52, even if this could of course be contemplated, without departing from the scope of the invention. This feature is in particular due to the pyramid shape rear portion 52 gradually going away from the axis of the engine, such that the primary flow, which anyway decreases in heat intensity as it goes to the rear, induces a lesser heat impact on the rear portion 52.

Having each of the abovementioned elements as a single piece does not preclude the possibility to manufacture them using several distinct portions fixedly assembled to each other, as for example several portions arranged successively in the direction X and/or in the direction Z. This is also true for the following elements which will be described as being likely to be manufactured as a single piece.

Figure 2:
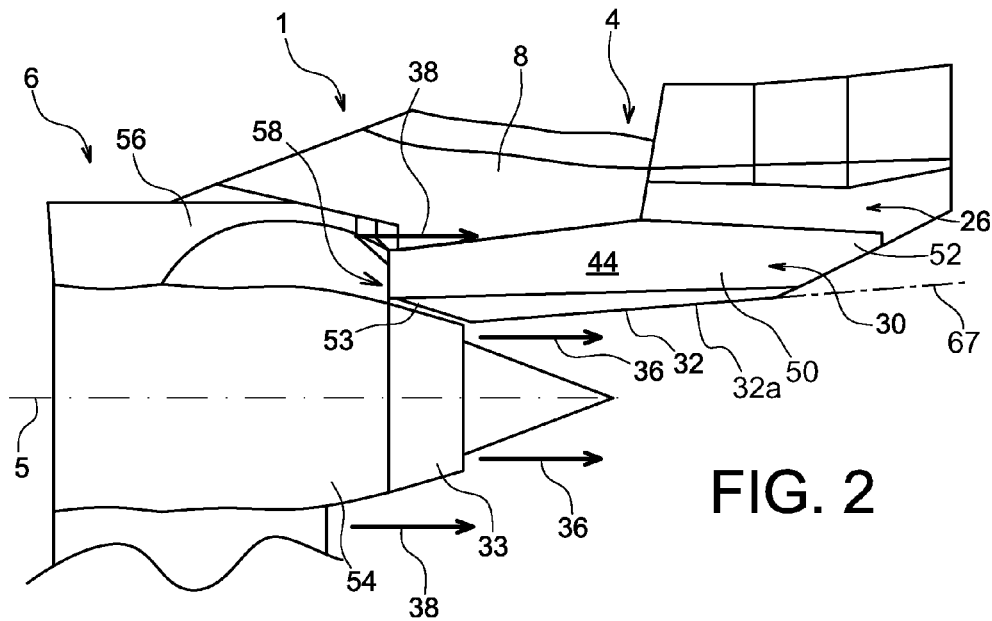

FIG. 2 illustrates in a greater scale a rear part of the propelling assembly 1, including an inner part of the nacelle of this assembly 1, this inner part comprising an inner annular envelope 54, sometimes called Inner Fan Structure (IFS), intended to internally bound the secondary flow channel 40, as well as two branching longitudinal walls 56, only one of which is visible in FIG. 2, which are connected to the inner envelope 54 and intended to guide the secondary flow 38 about some parts of the attaching pylon 4 through which the secondary flow channel 40 passes, such as a front part of the rigid structure 8 as well as the engine fasteners 10 and 12.

Figure 3:
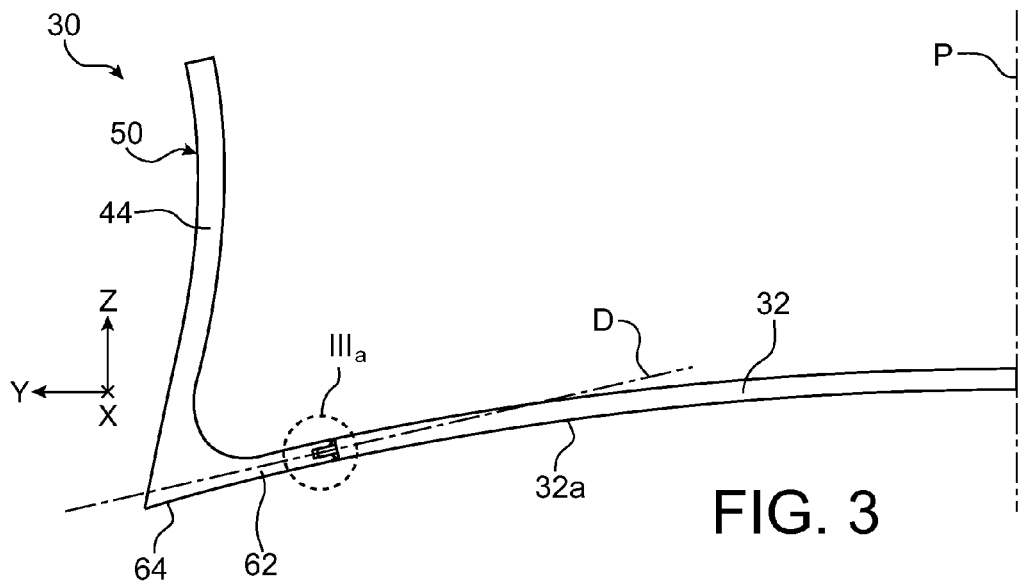
FIG. 3 is a transverse cross-section partial half-view of an aft aerodynamic fairing of the propelling assembly of FIGS. 1 and 2.
Figure 3A:
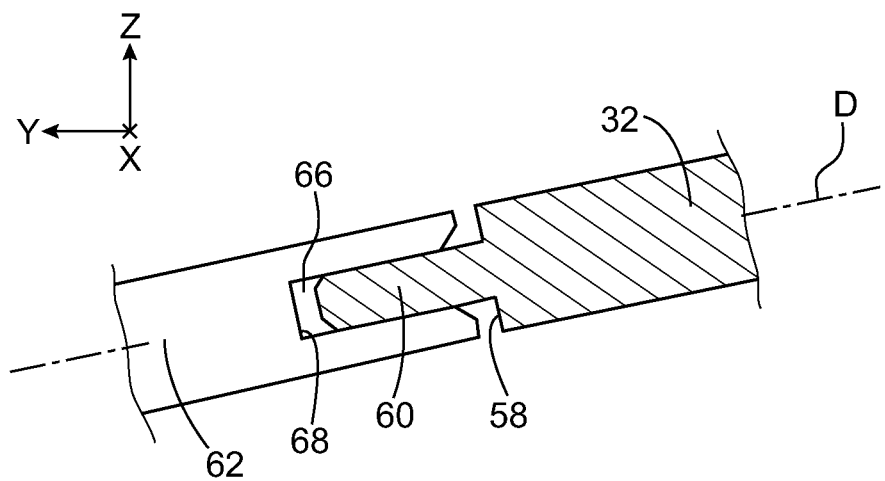
FIG. 3a is a view in a greater scale of the detail Ma of FIG. 3.

According to a characteristic of the invention illustrated by FIGS. 3 and 3a, the heat-shield floor 32 has generally the form of a curved plate in the transverse direction Y, having two opposed side edges 58 each provided with a side tab 60 (FIG. 3a) projectingly extending from the edge of the abovementioned rib 58.

FIG. 3 generally represents an upper half of the fairing 30. The other half of this fairing 30 can of course be wholly deduced from this figure by a simple symmetry along the plane P of FIG. 1.

Each side panel 44 of the aft aerodynamic fairing 30 has a rim 62 or projection (FIG. 3) extending from a lower end 64 of the panel 44, wholly in the direction of the side panel 44 opposite to this fairing 30.

The rim 62 of each side panel 44 includes a side groove 66 (FIG. 3a) extending longitudinally to one longitudinal end of the front part 50 of the fairing 30 to the other. Each side groove 66 wholly opens into the direction of the opposite side panel 44, throughout its longitudinal extent, and is opened forwardly and rearwardly respectively at both longitudinal ends thereof.

As appears more clearly in FIG. 3a, each side tab 60 is loosely laterally engaged in the side groove 66 located on the same side, so as to make up a sliding link between the floor 32 and the side panels 44. This sliding link is approximately directed in the direction of the opposite side panel 44, and thus in a direction D included in a plane YZ orthogonal to the longitudinal direction X of the fairing. This direction D makes up the main sliding direction, according to the terminology of the present invention.

Generally, it thus appears that the side tabs 60 and the side grooves 66 form linking parts of the edges 58 of the heat-shield floor 32 to the side panels 44, and thus make up supporting structure of the floor 32 to the caisson structure of the fairing 30.

The assembly clearance of each tab 60 in the corresponding groove 66 in the main sliding direction D allows relative transverse deformations between the floor 32 and the caisson structure of the fairing 30, in particular deformations resulting from differential expansions of these elements.

Besides, the floor 32 is flared towards the rear, that is the side edges 58 of this floor come closer to each other towards the rear. This shape of the floor 32 arises from the fact that the aft aerodynamic fairing 30 as a whole has a shape tapered to the rear for aerodynamism reasons. Analogously, the respective bottoms 68 of the side grooves 66 also come closer to each other towards the rear, such that the clearance between the side tabs 60 and the corresponding bottoms 68 of the side grooves 66 is substantially constant throughout the longitudinal extent of the tabs 60.

When the floor 32 is in its nominal position, the engagement of the side tabs 60 of the floor in the corresponding grooves 66 is made with a clearance allowing travelling movement of the floor 32 over a short distance to the rear in a plane comprising the edges 58 of this floor, that is in the longitudinal direction 67 of the floor (FIG. 1). The bottom 68 of each groove 66 thus forms a stop to arrest travelling motion of the floor 32 towards the rear beyond this short distance.

The immobilization of this floor in the longitudinal direction thereof is ensured by securing members arranged to secure a front end of this floor to the caisson structure of the aft aerodynamic fairing 30. These securing members enable in particular the floor 32 to be maintained in its nominal position while preventing any global translation of this floor to the rear.

Alternatively, the heat-shield floor 32 can be longitudinally maintained by securing members arranged to secure a rear end of this floor to the caisson structure of the aft aerodynamic fairing 30.

In both cases, the heat-shield floor 32 can be assembled to the caisson structure of the fairing 30 simply by inserting the side tabs 60 of the floor 32 in the side grooves 66 by the front end of each of these grooves, and then by pushing the floor 32 to the rear up to its nominal position, and finally by securing one of its longitudinal ends to the caisson structure of the aft aerodynamic fairing 30.

Figure 4:
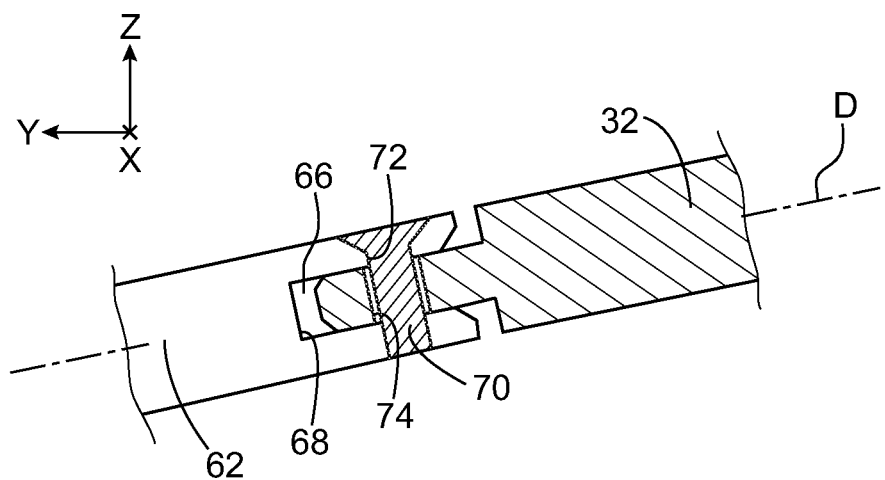
FIG. 4 is a view similar to FIG. 3a, of an aft aerodynamic fairing of a propelling assembly for an aircraft according to a second preferred embodiment of the present invention.

FIG. 4 illustrates a second preferred embodiment of the invention, wherein the aft aerodynamic fairing 30 is similar to that described above, but the linking parts further includes retainer elements 70, taking for example the form of screws, through which first ports 72 passing through each rim 62 of a panel 44 and opening into the corresponding groove 66 pass, as well as second ports 74 provided within each side tab 60 and each aligned with a corresponding first port 72.

The first ports 72 are of a diameter substantially equal to the diameter of the retainer elements 70 so as to enable a snug fit of these elements in these first ports, whereas the second ports 74 are of a diameter greater than that of the retainer elements 70, such that there is a clearance between each of these elements and the corresponding side tab 60.

As shown in FIG. 4, each first port includes a counter sink cooperating with a head of the corresponding retainer element 70 for centering the latter in the corresponding second port 74.

The retainer elements 70 thus provide for further safety against any disengagement of the means for supporting the floor 32 as a result of travelling motion of the same.

Although the present invention has been described in connection with various embodiments, it will be appreciated from the specification that various combinations of elements, variations or improvements therein may be made, and are within the scope of the invention.

The invention claimed is:

1. An aft aerodynamic fairing for a pylon for attaching an aircraft propelling assembly, including a caisson structure, a heat-shield floor provided with an external surface such that a combustion gas flow from a turbine engine of said propelling assembly conforms to the shape thereof, as well as supporting structure of this floor comprising linking parts arranged to link two side edges of this floor to the caisson structure, wherein said linking parts of each side edge of the floor are configured so as to allow travelling motion of said side edge of the floor relative to the caisson structure in a corresponding direction included in a plane orthogonal to a longitudinal direction of the fairing.

2. The aft aerodynamic fairing according to claim 1, wherein said linking parts are configured so as to further allow travelling motion of each of said side edges of the floor relative to the caisson structure in a longitudinal direction of the floor.

3. The aft aerodynamic fairing according to claim 1, wherein said linking parts of each side edge of the floor comprise a corresponding side groove integral with a first element among the caisson structure and the floor and extending from the front to the rear along this first element by being opened in said corresponding direction included in the plane orthogonal to the longitudinal direction of the fairing, as well as a corresponding side tab integral with the second element among the caisson structure and the floor, said side tab extending from the front to the rear along this second element and being engaged in the corresponding groove so as to provide for support of said floor.

4. The aft aerodynamic fairing according to claim 3, wherein the transverse extent of said floor, as well as the gap between respective bottoms of the two side grooves belonging to the linking parts of said edges of the floor respectively, are reduced from the front to the rear of the fairing.

5. The aft aerodynamic fairing according to claim 3, wherein each side tab of said linking parts includes at least one port through which a corresponding retainer element integral with said first element among the caisson structure and the floor loosely passes, so as to allow said travelling motion of the corresponding side edge of the floor relative to the caisson structure in the corresponding direction included in the plane orthogonal to the longitudinal direction of the fairing.

6. An attaching pylon for an aircraft propelling assembly, comprising an aft aerodynamic fairing according to claim 1.

7. A propelling assembly for an aircraft, including a turbine engine, as well as the attaching pylon according to claim 6 intended to attach this turbine engine to one of an aerofoil or to a fuselage of the aircraft.

8. An aircraft comprising a propelling assembly according to claim 7.

9. A method for assembling an aft aerodynamic fairing according to claim 3, comprising the steps of:
positioning said heat-shield floor in front of said caisson structure of the fairing by bringing each side tab of said linking parts facing said corresponding side groove;
moving said floor in travelling motion to the front relative to said caisson structure, by engaging and then sliding each side tab in said corresponding side groove, until the floor reaches a nominal position.

* * * * *